UNITED STATES PATENT OFFICE.

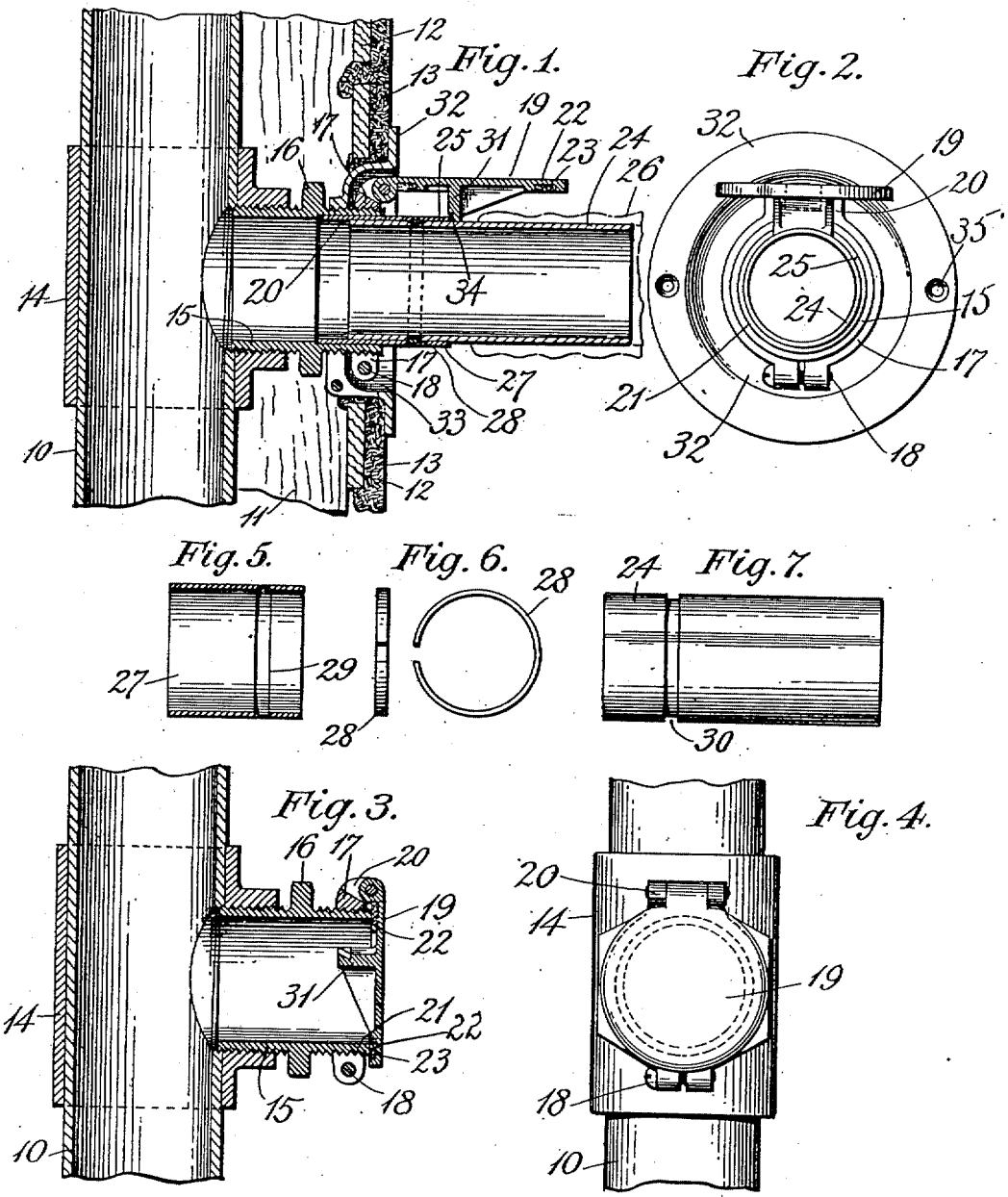

IRA H. SPENCER, OF HARTFORD, CONNECTICUT, ASSIGNOR TO THE SPENCER TURBINE CLEANER COMPANY, OF HARTFORD, CONNECTICUT, A CORPORATION OF CONNECTICUT.

CONNECTION FOR PNEUMATIC SYSTEMS.

981,706. Specification of Letters Patent. Patented Jan. 17, 1911.

Application filed April 8, 1908. Serial No. 425,965.

*To all whom it may concern:*

Be it known that I, IRA H. SPENCER, a citizen of the United States, and a resident of Hartford, in the county of Hartford and State of Connecticut, have invented a new and Improved Connection for Pneumatic Systems, of which the following is a specification.

My invention relates to the class of devices herein set out, and the object of my invention is to provide a device of this class having numerous novel features of advantage and utility.

One form of device in the use of which these objects may be attained is illustrated in the accompanying drawings, in which—

Figure 1 is a view in longitudinal section through a connection of a pneumatic system, said connection being shown as extending through a wall. Fig. 2 is a face view of the same, the wall being omitted. Fig. 3 is a view similar to Fig. 1 showing the arrangement of the connection when a main pipe is located without a wall, as within a room. Fig. 4 is a face view of the same. Fig. 5 is a detail view in section through the retaining sleeve. Fig. 6 is a view showing the construction of the retaining ring. Fig. 7 is a side view of the nipple.

In the accompanying drawings the numeral 10 denotes the main pipe of a pneumatic system and by main pipe is meant any pipe of the system to which a connection, as for a hose or like part, is made.

It will be understood that this main pipe is suitably connected with apparatus for creating a flow of air through the pipe, and in the arrangement shown in Fig. 1 this pipe is illustrated as extending vertically within the wall of a building, this wall including the usual construction embodying studding 11, lathing 12 and plastering 13, the form of device shown in Fig. 1 being a satisfactory construction when a system is installed in a building during the course of construction. My improved connection is especially adapted for use not only with a system installed as above described, but also with a system that may be installed after the completion of the building, and in which the pipes may be located directly within the rooms, usually extending close to the walls thereof.

A union 14 is secured to the main pipe 10 and a coupling 15 is suitably secured to rotate thereon, in the preferred form, which is shown herein, the engagement being by means of screw threaded parts. This coupling is threaded at its outer or free end and a flange 16, provided with any suitable means for the reception of a wrench or like tool for turning the coupling, is located intermediate the ends of the coupling.

A valve support 17, preferably in the form of a clamp collar threaded on its interior, is located upon the coupling, a clamp screw 18 passing through the ears on the opposite sides of the opening in the split ring, serving to clamp the support in position. A valve 19 is pivoted between lugs 20 on the support and closes the mouth 21 into the coupling 15, the edges of the opening forming the mouth constituting a valve seat, and the valve having an annular groove 22 containing a packing 23 of any suitable material.

It will be noted that by means of the interengaging screw threads on the coupling and valve support, the latter may be located in different positions of adjustment along the coupling, thereby enabling the valve to be properly positioned to fit the valve seat and tightly close the opening into the coupling.

In the operation of apparatus of this character there is a liability in the manipulation of the hose and devices secured thereto of disengaging the nipple from the coupling, and to avoid this annoyance a locking device to hold the parts in engagement and constructed in accordance with the following description is employed.

A nipple 24 having a shoulder 25 fits within the opening in the coupling, this nipple serving as a means of attachment for a hose or the like to the coupling, such hose or tube being illustrated in dotted lines at 26 in Fig. 1 of the drawings.

The shoulder 25 may be formed upon the nipple in any desired manner, as shown herein a sleeve 27 being secured to the nipple as by means of a spring split ring 28 which is sprung into an annular groove 29 in the sleeve 27 and when released springs into a groove 30 in the nipple 24, the ring being of such thickness as to lie in both grooves, thus holding the nipple and sleeve securely engaged.

A lock 31 is located on the valve to engage the shoulder 25 on the nipple, in the form herein shown this lock consisting of a projection from the inner face of the valve located in position to pass into the mouth of the coupling when the valve swings to place to close the opening into the coupling, the projection being also located to engage the shoulder 25 and thus prevent unintentional disengagement of the nipple and coupling. It will thus be seen that as the nipple is forced into place in the coupling the valve will act to lock it in place without special attention on the part of the operative to secure such result, the valve in its locking action being thus automatic.

If in adjusting the valve support to cause the valve to properly close the mouth into the coupling, it shall be found that the valve pivot is not located at the top the coupling may be readily turned to properly locate the pivot at the top.

The thread on the outer end of the coupling is of sufficient length to receive a face piece 32, this face piece being employed when the connection is to a pipe located in the wall of a building as shown in Fig. 1, or when such connection projects upward from a floor, the face piece being supplied with any desired means for securing it in place. It has a recess 33 of a size to receive the support 17 and valve thereon, which may thus be located within said recess presenting a very sightly appearance.

It will be seen that certain parts of the device are adapted for use in connection with systems of different construction and that to meet certain requirements it is necessary only to add a single part, as the face piece 32 thereto.

The lock 31 is provided with an undercut portion 34 in which the beveled end of the shoulder 25 engages. The parts are formed in this manner to more securely hold them in engagement, the beveled shoulder engaging this undercut portion preventing the valve from rising to allow disengagement of the parts.

It will be noted that the adjustment of the face piece 32 rotarily upon the coupling will allow placing of the holes 35 in position to surely engage as within a lath, if it shall be found that in a certain position the screws will pass through a crevice between the lathing.

I claim—

1. A fixed member having an air channel, a supporting member rotatably attached to said fixed member whereby the pivot of a valve located on the supporting member may be positioned uppermost, said supporting member having an opening communicating with the air channel in the fixed member and also having a threaded end, a valve support threaded to fit said threaded end whereby a valve may be positioned to accurately seat, and a gravity closed valve pivotally attached to said support.

2. A valve support threaded to fit the threaded end of a coupling whereby the position of a valve may be fixed to accurately seat the valve, the valve pivotally attached to said support, the coupling to receive said valve support and a union fixed as to position and having a threaded part to receive said coupling whereby the latter may be adjusted to determine the position of the pivot of the valve, said union having a mouth and said coupling having an air channel communicating with said mouth.

3. A member having an opening with a valve seat formed about the mouth thereof, said member being adapted to receive an attached member, a valve mounted to close said opening, and a lock positioned on the valve to enter said opening and arranged to engage and hold said attached member.

4. A member having an opening with a valve seat formed about the mouth thereof, said member being adapted to receive an attached member, a valve mounted to close said opening, and a lock arranged on the face of the valve to enter said opening and to automatically engage and hold said attached member.

5. A union, a coupling projecting therefrom and having a threaded end, a face piece having an outwardly opening mouth and adapted to fit said threaded end and closely inclosing a valve support, the valve support fitting said threaded end within said mouth, and a valve mounted on said support.

6. A union, a coupling attached thereto by intermeshing threads and having a threaded outer end, a face piece having an outwardly opening mouth and adapted to fit said threaded end and closely inclosing a valve support, the valve support fitting said threaded end and arranged to be located within said mouth, and a valve mounted on said support.

IRA H. SPENCER.

Witnesses:
REGINALD BIRNEY.
E. J. HEALY.